United States Patent Office 3,087,600
Patented Apr. 30, 1963

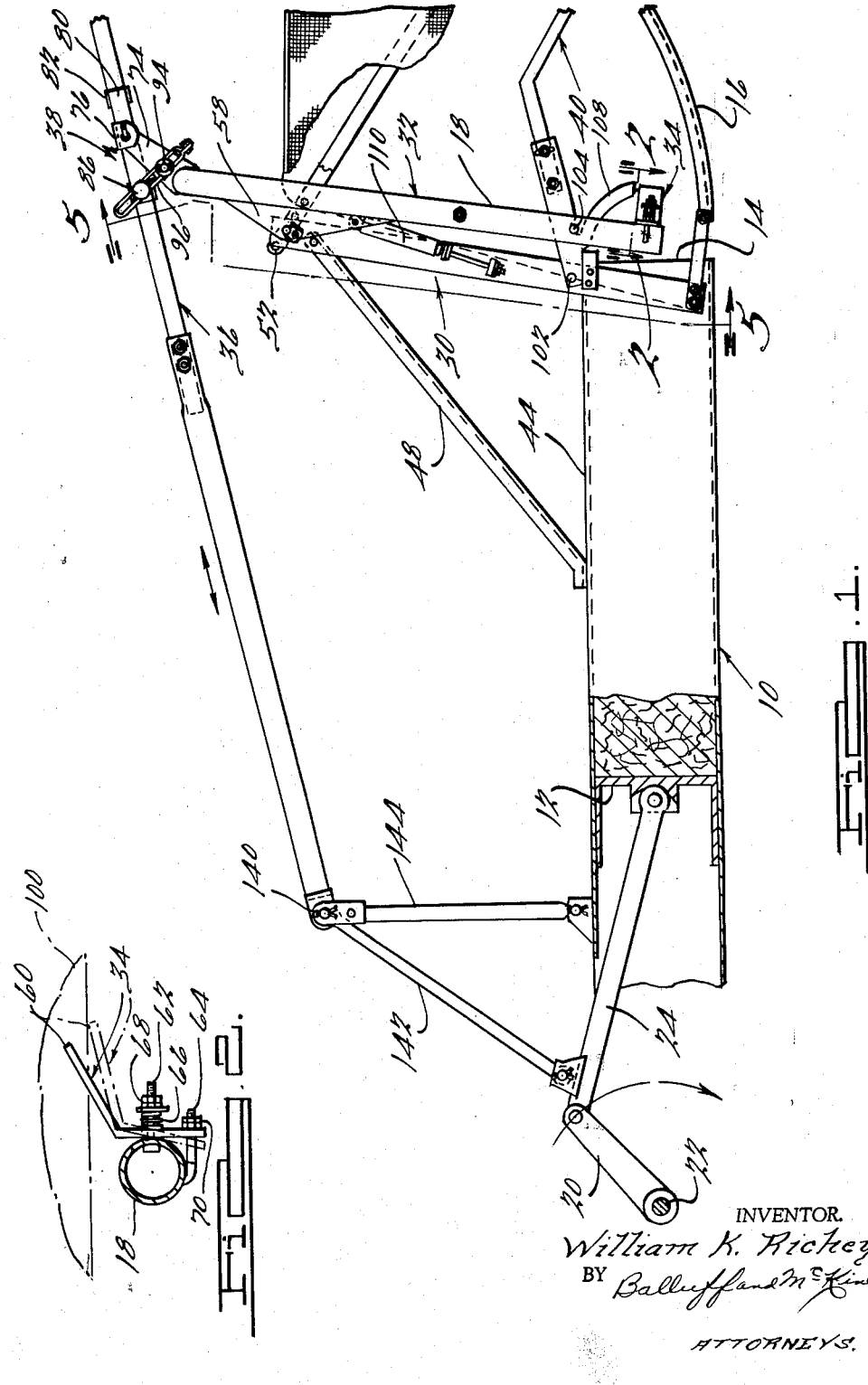

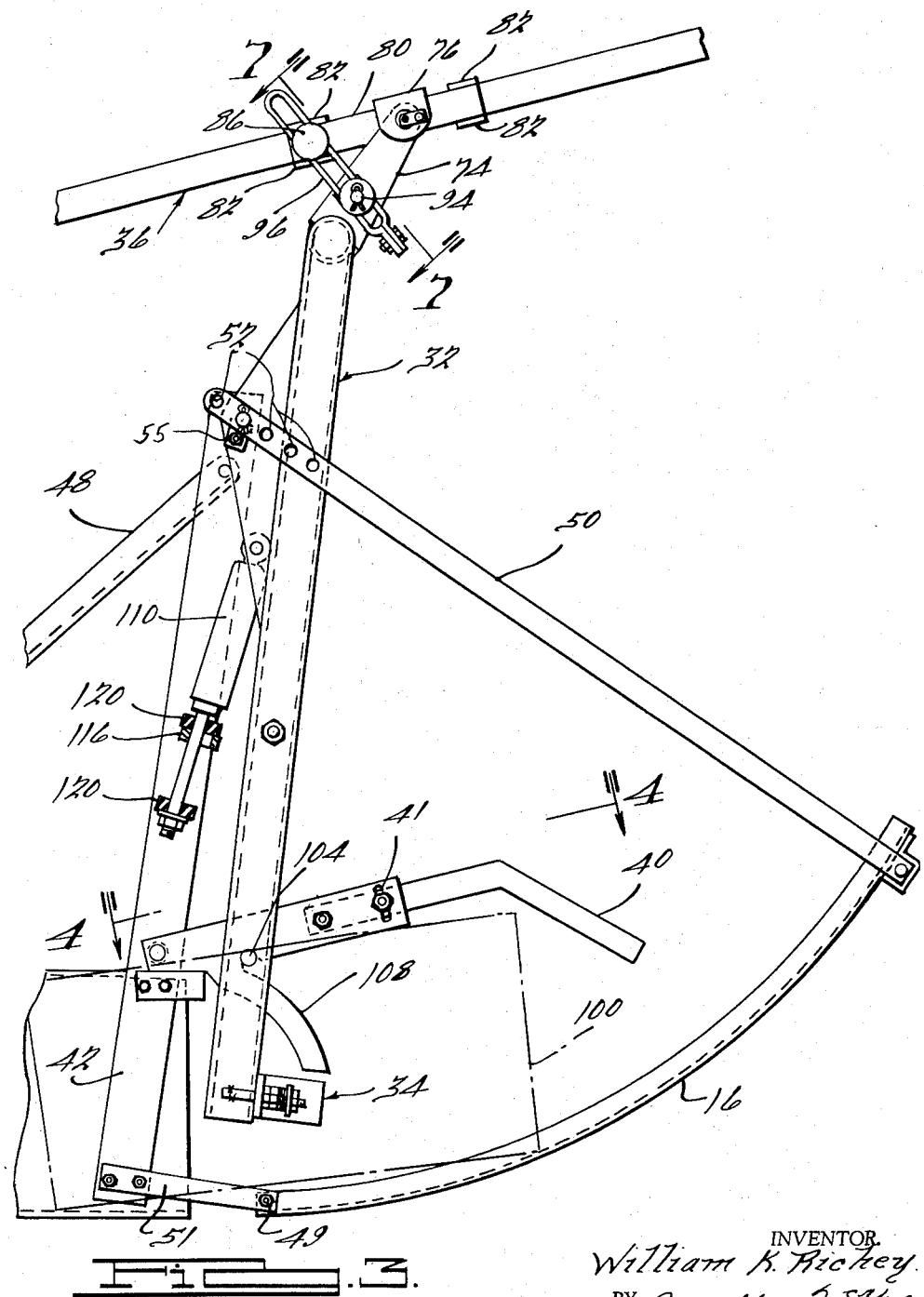

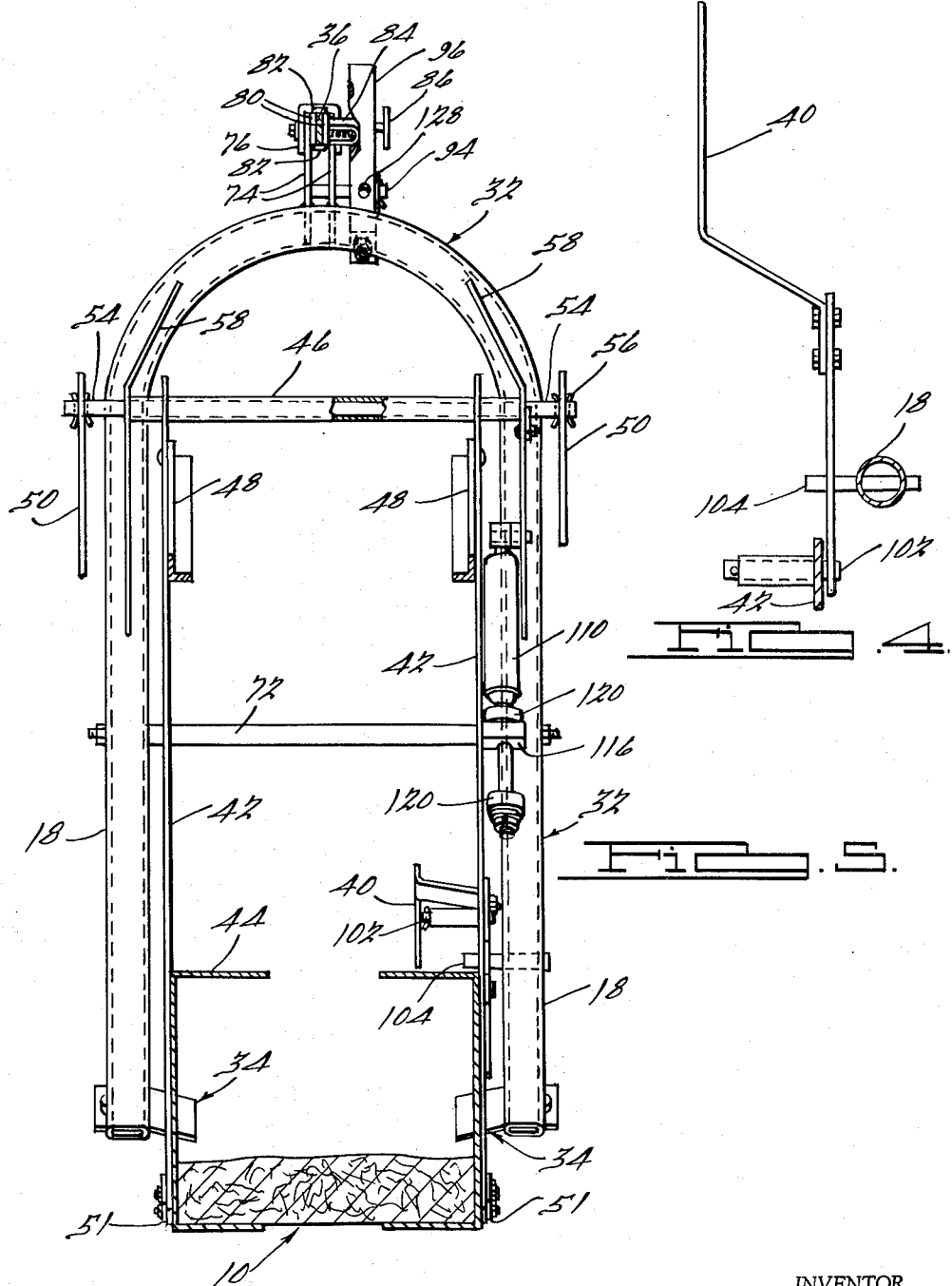

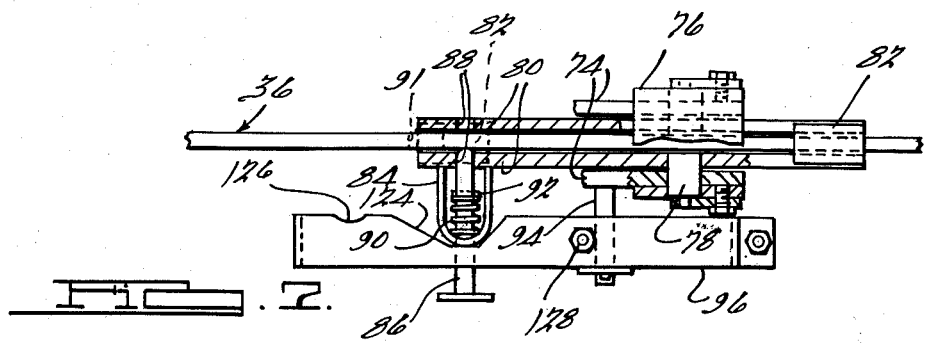
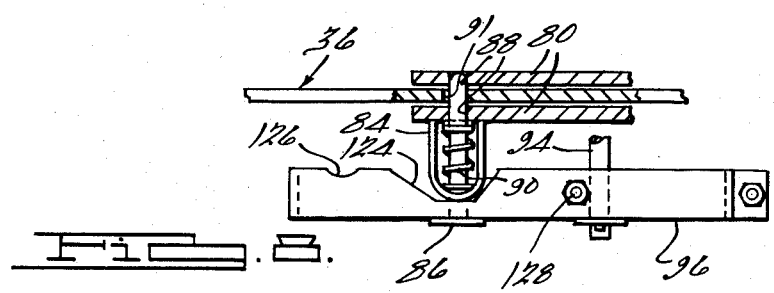
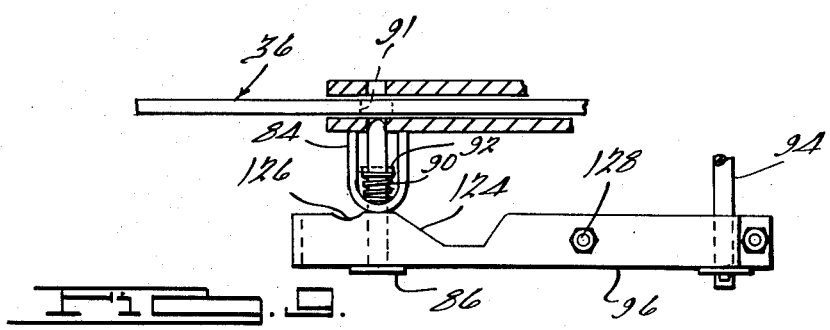
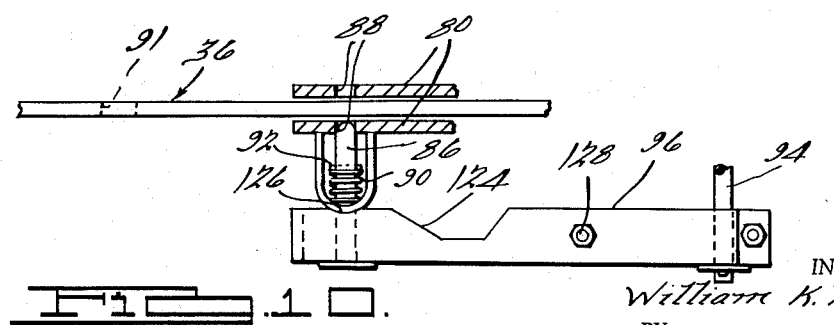

3,087,600
BALE THROWER
William K. Richey, Columbus, Ohio, assignor to The Five Manufacturing Company, Inc., Columbus, Ohio, a corporation of Ohio
Filed Mar. 16, 1962, Ser. No. 180,170
13 Claims. (Cl. 198—128)

This invention relates to bale throwers and has particular reference to one which is adapted to be associated with a crank operated hay baler for throwing the bales of hay as they emerge from the baler into a collecting wagon coupled to and following the baler. Where the baler is coupled to a tractor, the use of the bale thrower in association with the baler and the following wagon makes it possible for the tractor operator to bale hay and load the bales while driving the tractor and without any additional labor.

While bale throwers are now in use, the types commercially available leave considerable to be desired in that they are relatively complicated, heavy, and expensive, and for these and other reasons they are not entirely satisfactory.

A principal object of the invention is to provide a novel, simple and efficient bale thrower which is rugged in construction and in addition may be readily adapted for use with various makes of hay balers currently in use.

A bale thrower embodying my invention is particularly adapted for use in connection with a crank operated baler. However, it may be adapted to other types of balers and may be provided with its own engine whereby it can be powered independently of the baler. A bale thrower embodying my invention is characterized by its simplicity, low cost of construction, and light weight, and it does not require the considerable power transmitting mechanism now employed in conventional bale throwers. A unique feature of the bale thrower construction is the arrangement wherein the bale throwing arms are power driven only during the throwing stroke, which makes it possible to better control and adjust the operation of the bale thrower.

Other and further objects of the invention will be apparent from the following description and claims and may be understood by reference to the accompanying drawings, of which there are six sheets, which by way of illustration show preferred embodiments of the invention and what I now consider to be the best mode of applying the principles thereof. Other embodiments of the invention may be used without departing from the scope of the present invention as set forth in the appended claims.

In the drawings:

FIGURE 1 is a fragmentary side elevational view, partially in section, of a crank operated hay baler and bale thrower operatively associated therewith;

FIGURE 2 is an enlarged fragmentary sectional view taken along the line 2—2 of FIGURE 1 and illustrating one of the bale holding means on the end of a bale thrower arm;

FIGURE 3 is an enlarged fragmentary elevational view of the bale thrower;

FIGURE 4 is a fragmentary sectional view taken along the line 4—4 of FIGURE 3 and showing the trip arm which is actuated by the discharge of a bale from the baler;

FIGURE 6 is a view similar to FIGURE 3 but showing the bale thrower in two different positions;

FIGURE 7 is a fragmentary sectional view taken along the line 7—7 of FIGURE 3 and showing the normally disengaged latch of the coupling in its disengaged condition and which coupling is operable when the latch is engaged to connect the bale thrower to the reciprocating pull bar driven by the baler crank;

FIGURE 8 is a view similar to FIGURE 7 but showing the latch engaged and the parts as they appear in a view taken along the line 8—8 of FIGURE 6;

FIGURE 9 is a view similar to FIGURE 8 but showing the latch just after being disengaged as the bale thrower approaches the end of its throwing stroke;

FIGURE 10 is a view similar to FIGURE 9 but showing the latch in its locked out position at the end of the throwing stroke of the bale thrower;

FIGURES 11 and 12 are fragmentary side elevational views illustrating a modified form of the invention with the parts shown in different positions; and FIGURE 13 is a fragmentary elevational view of the mechanism illustrated in FIGURES 11 and 12.

Figure 5:
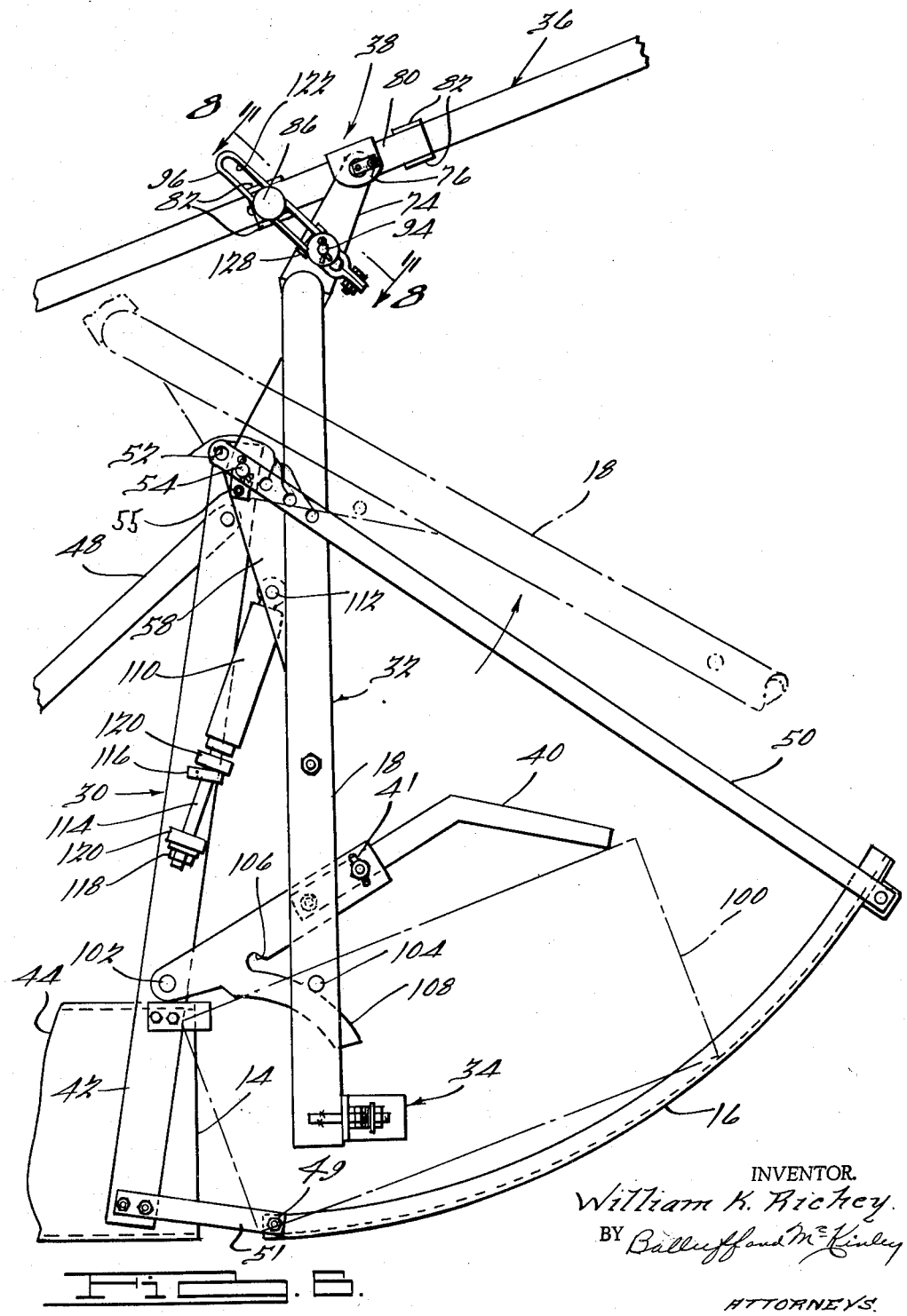
FIGURE 5 is an enlarged sectional view taken along the line 5—5 of FIGURE 1.

As shown in FIGURES 1 and 3, a bale thrower embodying my invention is operatively associated with a conventional crank operated baler so as to take hold of a bale 100 as it emerges from the discharge end of the baler 10 and hold such bale during the throwing stroke of the bale thrower whereby the bale is forcibly propelled and trajected away from the discharge end of the baler into a wagon in line with the baler and coupled to the back end thereof. The baler is mounted on wheels and adapted to be coupled to and powered by a tractor, the baler being operable to bale the hay into individual bales at the rate of three or four or more per minute, and including a reciprocating plunger 12 for compressing the hay and suitable provisions (not shown) for tying the bales.

As the bales are formed they are successively discharged rearwardly from the baler through the discharge outlet 14 onto a curved apron or chute 16 where they are picked up by the arms 18 of the bale thrower. A crank 20 fixed to rotate with a power driven shaft 22 has a connecting rod 24 connected thereto and to the plunger 12 whereby the plunger 12 may be reciprocated for compressing the hay in the bale. In conventional balers of the type with which the bale thrower of my invention is useful, the crank turns in the direction of the arrow at a speed of about 60–75 r.p.m. and has a 13–14 inch radius and an angular velocity of about 8 feet per second.

The bale thrower in general comprises a frame 30 adapted for mounting on the baler 10, a reciprocable bale thrower 32 pivoted on the frame, the bale thrower including the arms 18, bale holding means 34 on the lower ends of the arms, a reciprocable power transmitting member or pull bar 36 driven by the baler crank so as to be continuously reciprocated thereby as the crank turns in operating the baler, a normally disengaged coupling 38 carried by the upper end of the bale thrower 32 and operable for connecting the bale thrower 32 to the reciprocable power transmitting member 36 for driving the bale throwing arms 18 through their throwing stroke, a bale sensing device in the form of a trip 40 actuated by the discharge of the bale from the baler for effecting the engagement of the coupling 38, the coupling 38 including provisions operable by the thrower 32 as it approaches the end of its throwing stroke for effecting the disengagement of the coupling from the power transmitting member 36 so as to permit the gravity return of the thrower 32 to its starting position immediately adjacent the discharge end of the baler. The trip 40 is made of several pieces adjustably connected at 41.

As illustrated in FIGURES 1, 3 and 5, the frame consists of upright frame members 42 suitably affixed to the sides of the baler case 44 at the discharge end thereof and interconnected at their upper ends by a tube 46 which extends through openings in the upright frame members 42 and is welded thereto. A brace 48 is connected to the upper end of each of the frame members 42 and the baler case 44. The apron 16 is pivotally affixed at 49 to the rearwardly projecting ends of straps 57 affixed to the lower ends of the upright frame members 42, the pivotal connection 49 locating the upper surface of the apron 16 at or below the bottom surface of the discharge opening of the baler whereby the bales as they emerge from the baler will readily slide onto the apron 16. The free or rear ends of the apron 16 have pivotally connected thereto at the sides thereof a pair of braces 50 which are adjustably fixed to the upper ends of the upright frame members 42. The upper end of each brace 50 is provided with a series of holes 52. Shaft 54 rotatable in and projecting from the ends of the tube 46 extends through aligned holes 52 in braces 50 whereby the braces 50 support the outer end of the apron 16. The series of holes 52 make it possible to adjust the elevation of the outer end of the apron 16 and thus the trajectory of the bale. Cotter pins 56 on the ends of shaft 54 secure braces 50 in position.

The bale thrower indicated generally at 32 includes the parallel spaced arms 18 to which the bale holding means 34 are affixed. The bale thrower may consist of a piece of tubing bent into U-shaped form. A pair of brackets 58 is welded or otherwise suitably affixed to the thrower 32 at the same elevation, the brackets being provided with aligned holes through which the ends of shaft 54 extend whereby the bale thrower 32 is freely pivotally mounted on the frame so that the arms 18 are reciprocable from their starting or bale pick-up position as shown in FIGURE 1 through a throwing stroke to the discharge position shown in dotted lines in FIGURE 6, and then back by gravity through the return stroke to the starting position. Ear 55 welded to shaft 54 is bolted to bracket 58 so that the shaft 54 turns with the thrower 32 and the tube 46 functions as a bearing for the shaft 54.

The arms 18 are spaced apart so that in the starting position of the bale thrower the arms 18 straddle a bale as it is discharged from the baler. The bale holding means 34 on the arms are operable for taking hold of a bale at the discharge end of the baler and holding the bale during the throwing stroke of the arms 18 whereby the bale can be forcibly propelled by the arms 18 through their throwing stroke away from the discharge end of the baler and automatically released from the arms at the end of their throwing stroke.

As shown in FIGURES 1 and 2, each of the bale holding means 34 comprises a dog 60 which is secured to the arm 18 so as to yield in one direction thereby to permit the arm 18 to move clockwise freely relative to the bale during the return stroke of the bale thrower and so as to dig into the bale and take hold of it as the bale thrower moves in the opposite direction on its throwing stroke. A pair of studs 62 and 64 affixed to the arm 18 extend rather freely through spaced holes in the dog 60. A spring 66 on the stud 62 is confined between the dog 60 and a nut 68 on the stud 62. A nut 70 on the stud 64 limits the counterclockwise movement of the dog, looking at FIGURE 2, so that on the throwing stroke of the bale thrower the dogs 60 on the arms 18 will be effective to take hold of the bale therebetween whereby the thrower will forcibly propel the blade away from the discharge end of the baler. An adjustable tie rod 72 interconnects the arms 18 of the bale thrower whereby the spacing of the arms can be adjusted.

The bale thrower 32 includes an integral upwardly extending bifurcated arm 74 which carries the coupling 38 whereby the bale thrower can be connected to the continuously reciprocating pull bar 36 for effecting the throwing stroke of the bale thrower 32. The upper end of the bifurcated arm 74 is straddled by a U-shaped member 76 which carries a pair of trunnions 78 which provide a pivotal connection between the arm 74 and the coupling element or guide 80 which is slidable on the reciprocating pull bar 36. The element 80 straddles the bar 36 and is integrally connected at its ends by the crossovers 82 which together with the U-shaped member 76 slidably support the element 80 on the pull bar 36 inasmuch as the pull bar 36 is reciprocating with the crank 20 of the baler while the element 80 is pivotally carried by the bifurcated arm 74 of the bale thrower. A U-shaped member 84 is affixed to and projects laterally from one of the sides of the guide 80, and a latch or coupling pin or element 86 is slidable in a guide hole in the member 84 aligned with guide holes 88 in the element 80 forming an abutment for element 86. A spring 90 confined between the member 84 and a stop 92 on the pin 86 biases the pin 86 in a direction to project it through the holes 88. However, as shown in FIGURE 7, the end of the pin 86 is riding against the side of the pull bar 36 which has a hole 91 therethrough, the hole 91 normally reciprocating in a range which does not overlap the holes 88.

The bifurcated arm 74 carries a laterally extending pin 94 which with the latch pin 86 slidably supports a cam 96 which effects the disengagement of the latch pin 86 from the pull bar 34 as the bale thrower approaches the end of its throwing stroke, preferably at the end of the accelerative portion of such stroke as indicated by the dotted line portion of the arms 18 in FIGURE 6.

As a bale 100 emerges from the discharge end of the baler, as illustrated in FIGURE 3, it will actuate the trip 40 as illustrated in FIGURE 6 and rock the same upwardly about its pivotal mounting 102 on the frame 30. It will be observed from FIGURES 1 and 3 that a laterally extending pin 104 carried by one of the throwing arms 18 is disposed in a notch 106 in the trip 40, thereby locking the bale thrower 32 in its starting or home position. However, as the trip 40 moves upwardly in response to emergence of the bale 100, a cam 108 carried by the trip reacts on the pin 104 so as to move the bale thrower 32 in a counterclockwise direction from its starting or locked position to its unlatched position as shown in full lines in FIGURE 6. This causes the bifurcated arm 74 at the upper end of the bale thrower to shift the guide 80 leftward from the position illustrated in FIGURES 1 and 7 so as to bring the pin 86 within the range of movement of the hole 91 in the reciprocating bar 36, whereupon the pin 86 under the influence of the spring 90 will project through the hole 91 and through both of the holes 88 so as to couple or latch the guide 80 to the reciprocating bar 36 for movement therewith. The pin 86 can move into the hole 91 only while it is at the right-hand end of its range of travel, looking at FIGURE 8, and subsequent movement of the pull bar 36 to the left will carry the guide 80 and the arm 74 of the thrower to the left, thus effecting the throwing stroke of the bale thrower 32.

One end of a shock absorber 110 is pivotally connected at 112 to the bracket 58 while the piston rod 114 of the shock absorber extends through a guide hole in a laterally extending bracket 116 fixed to the upright frame member 42. A nut 118 is threaded on the threaded end of the rod 114 and a rubber cushion ring 120 is disposed on the rod between the bracket 116 and the nut 118 and also between the bracket 116 and the cylinder of the shock absorber 110. The shock absorber functions to limit the length of the throwing stroke of the bale thrower 32 and also cushions the shock due to the sudden deceleration at the end of such stroke. The shock absorber 110 provides resistance only at the end of the throwing stroke of the bale thrower so that the bale thrower is free to return by gravity to its starting position as shown in FIGURE 1. The latch pin 86 is disengaged from the pull bar 36 preferably before the arms 18 are checked by the shock absorber 110.

The bale thrower 32 in its throwing stroke accelerates the bale to a sufficient velocity (about 25–30 ft./sec.) so as to traject it along the path defined by the apron 16 into a collecting wagon coupled to and following immediately behind and in line with the baler.

As the bale thrower completes the accelerative portion of its throwing stroke, the pin 94 on the arm 74 which extends through the slot 122 in the cam 96 will move to the position illustrated in FIGURE 9 so as to shift the cam 96 in a direction to cause the cam surface 124 to ride up the end surface of the member 84 and thereby react on the head of the pin 86 so as to effect the disengagement of the pin 86 from the abutment 91 on the pull bar 36, thus unlatching or uncoupling the thrower arm from the pull bar 36. The pin 94 on the arm 74 continues to react on the cam 96 so as to shift it further to the right and seat the end of the member 84 in the notch 126 in the cam as illustrated in FIGURE 10 so as to hold the pin 86 in its disengaged position during the time that the bale thrower 32 is returning from the end of its throwing stroke to its starting position as illustrated in FIGURE 1. However, just shortly before the bale thrower 32 arrives at its starting position, the pin 94 carried thereby will react on the stop provided by bolt 128 so as to shift the cam 96 from the position illustrated in FIGURE 10 to that illustrated in FIGURE 7 so as to reposition the parts of the coupling in their starting position for the succeeding cycle.

The pull bar 36 has a pivotal connection 140 with a link 142 which in turn is pivotally connected to the connecting rod 24 so that the bar 36 is continuously reciprocated by the crank 20 during operation of the baler. An arm 144 also pivotally connected at 140 to the bar 36 serves to stabilize the bar 36.

In the modified form of construction illustrated in FIGURES 11, 12 and 13, the mode of operation is the same as that of the construction illustrated in FIGURE 1. However, the coupling for connecting the bale thrower 32 to the reciprocating power transmitting member is different and is located forwardly of the thrower 32 instead of being directly associated with the upper arm 74 of the thrower 32. In the case of FIGURES 11, 12 and 13, an adjustable pull bar 236 is pivotally connected at 238 to the upwardly extending arm 74 of the thrower 32 and at its other end is pivotally connected at 240 to a pivoted arm 242 which is pivoted at 244 to a bracket on the baler 10.

The coupling here comprises an upstanding bolt 246 which is mounted on the upper end of a pivoted arm 248 and connected by a link 142 to the connecting rod 24 of the baler whereby the bolt 246 will be reciprocated in a range outside the range of the keeper 250. The keeper 250 is pivoted at 251 to the upper end of the arm 242, and in the locked or pick-up position of the thrower 32, as per FIGURE 1, will be positioned as illustrated in FIGURE 11. A spring 252 connected at one end to a part of the keeper 250 and at its other end to the pivotal connection 240 biases the keeper 250 to the position illustrated in FIGURE 11. However, when the bale sensing trip 40 is actuated to unlock the bale thrower 32 and shift the same to the position shown in full lines in FIGURE 6, the bar 236 will shift the arm 242 so as to position the trip 253 on the keeper 250 in the range of bolt 246, whereupon the bolt 246 will engage the trip 253 and shift the keeper 250 to the position as shown in FIGURE 12 in operative engagement with the bolt 246 so that as the bolt 246 moves forward the bar 236 will be coupled therewith to effect the throwing stroke of the bale thrower 32.

As the thrower 32 approaches the end of its throwing stroke as previously described, the pin 260 on the bar 236 which projects through the slot 262 in the link 264 will engage the end of the slot 262 and shift the keeper 250 to the dotted line position shown in FIGURE 12, being aided in this respect by the overcenter arrangement of the spring 252. The link 264 is pivoted at 265 to the keeper 250.

Upon return of the bale thrower 32 to its pick-up position as shown in FIGURE 1, the link 264 will be positioned as shown in FIGURE 11 and pin 260 will cooperate with the link 264 to shift the keeper 250 to the position shown in FIGURE 11, which is outside the range of reciprocating movement of the bolt 246.

It will be evident from the foregoing that the bale thrower is automatically operable to traject bales as they are discharged from the baler directly into a following pickup wagon. The trajectory of the bales can be modified by raising or lowering the chute 16. The thrower incorporates many adjustments, making it possible to readily adjust the same while it is in service. Throwers made in accordance with the construction of FIGURES 1 to 10 have been built and successfully operated to handle as many as 15 bales of about 40 pounds each per minute, and the weight of such throwers is less than 200 pounds.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A bale throwing apparatus for association with a crank operated baler and comprising a frame, a reciprocable bale thrower freely pivoted on said frame and having arms power driven through a throwing stroke and movable by gravity on the return stroke to straddle a bale as it is discharged from the baler, bale holding means on the arms operable for taking hold of a bale at the discharge end of the baler and holding the bale during the throwing stroke of the arms whereby said bale can be forcibly propelled by said arms through their throwing stroke away from the discharge end of the baler and released from said arms at the end of their throwing stroke, a reciprocable power transmitting member driven by said baler crank so as to be reciprocated thereby as the crank turns in operating the baler, normally disengaged coupling means carried by the bale thrower and operable for connection to said reciprocable power transmitting member for driving the bale throwing arms through their throwing stroke, means actuated by the discharge of a bale from said baler for effecting the engagement of said coupling means, and means operable by said thrower at the end of its throwing stroke for effecting the disengagement of said coupling means from said power transmitting member.

2. A bale throwing apparatus according to claim 1 including a shock absorbing means cooperable with said bale thrower for checking and limiting the travel of the bale thrower at the end of the throwing stroke thereof.

3. A bale throwing apparatus in combination with a crank operated baler and comprising a frame mounted on a baler, a reciprocable bale thrower freely pivoted on said frame and having arms power driven through a throwing stroke and movable by gravity on the return stroke to a starting position to straddle a bale as it is discharged from the baler, bale holding means on the arms operable for taking hold of a bale at the discharge end of the baler and holding the bale during the throwing stroke of the arms whereby said bale can be forcibly propelled by said arms through their throwing stroke away from the discharge end of the baler and released from said arms at the end of their throwing stroke, a reciprocable power transmitting member driven by said baler crank so as to be reciprocated thereby as the crank turns in operating the baler, normally disengaged coupling means operable for connecting said reciprocable power transmitting member and bale thrower for driving the bale throwing arms through the accelerative portion of their throwing stroke, means actuated by the discharge of a bale from said baler for moving said bale thrower to effect the engagement of said coupling means, and means operable by said thrower at the end of its throwing stroke for effecting the disengagement of said coupling means from said power transmitting member.

4. Bale throwing apparatus according to claim 3 wherein said coupling means comprise an abutment on said reciprocable power transmitting member, a guide relatively slidable with respect to said member, a pin on said guide biased toward a position to engage said abutment and wherein said bale thrower in its starting position, positions said guide so that said pin is outside of the range of movement of said abutment.

5. A bale throwing apparatus comprising a frame, a reciprocable bale thrower freely pivoted on said frame and having arms power driven through a throwing stroke and movable by gravity on the return stroke to a bale pick-up position, bale holding means on the arms operable for taking hold of a bale at such position and holding the bale during the throwing stroke of the arms whereby said bale can be forcibly propelled by said arms through their throwing stroke away from the pick-up position and released from said arms at the end of their throwing stroke, a power driven reciprocable power transmitting member, normally disengaged coupling means associated with the bale thrower and operable for connecting the bale thrower to said reciprocable power transmitting member for driving the bale throwing arms through their throwing stroke, means actuated by a bale at the pick-up position for effecting the engagement of said coupling means, and means operable by said thrower at the end of its throwing stroke for effecting the disengagement of said coupling means from said power transmitting member.

6. Bale throwing apparatus according to claim 5 wherein said coupling means comprise an abutment on said reciprocable power transmitting member, a guide relatively slidable with respect to said member, a pin on said guide biased toward a position to engage said abutment and wherein said bale thrower in its starting position, positions said guide so that said pin is outside of the range of movement of said abutment.

7. A bale throwing apparatus for association with a baler and comprising a frame, a reciprocable bale thrower mounted on said frame and having arms power driven through a throwing stroke and movable by gravity on the return stroke to a bale pick-up position, bale holding means on the arms operable for taking hold of a bale at such position and holding the bale during the throwing stroke of the arms whereby said bale can be forcibly propelled by said arms through their throwing stroke away from such position and released from said arms at the end of their throwing stroke, a power driven reciprocable power transmitting member, coupling means operable for interconnecting said reciprocable power transmitting member and bale thrower for movement in one direction only for driving the bale throwing arms through the accelerative portion of their throwing stroke, and bale sensing means responsive to a bale at the pick-up position for effecting the engagement of said coupling means.

8. Apparatus according to claim 7 wherein said coupling means comprises a guide slidable on said power transmitting member, an abutment on said member, and a pin carried by said guide and engageable with said abutment for interconnecting said guide and power transmitting member for movement together.

9. A bale throwing apparatus for association with a baler and comprising a frame whereby said apparatus can be mounted on a baler, a reciprocable bale thrower pivoted on said frame and having arms power driven through a throwing stroke and movable by gravity on the return stroke to a pick-up station for picking up a bale as it is discharged from the baler, bale holding means on the arms operable for taking hold of a bale at the discharge end of the baler and holding the bale during the throwing stroke of the arms whereby said bale can be forcibly propelled by said arms through their throwing stroke away from the discharge end of the baler and released from said arms at the end of their throwing stroke, a reciprocable power transmitting member, normally disengaged coupling means operable for connecting said reciprocable power transmitting member to said bale thrower for driving the bale throwing arms through their throwing stroke, locking means locking the bale thrower in its pick-up position, means actuated by the discharge of a bale from said baler for releasing said locking means and for effecting the engagement of said coupling means, and means operable at the end of the bale throwing stroke for effecting the disengagement of said coupling means.

10. A bale throwing apparatus comprising a frame, a reciprocable bale thrower pivoted on said frame and movable from a bale pick-up position through a throwing stroke and then through a return stroke back to such bale pick-up position, such bale thrower having bale holding means operable for taking hold of a bale at the pick-up position and holding the bale during the throwing stroke whereby the bale can be forcibly propelled by the thrower through its throwing stroke away from the pick-up position and released at the end of the throwing stroke, a power driven reciprocable power transmitting member, coupling means associated with the bale thrower and operable when engaged for connecting the bale thrower to the power transmitting member for driving the bale thrower through the throwing stroke, locking means for locking the thrower in the pick-up position, means actuated by a bale at the pick-up position for releasing said locking means and for effecting the engagement of said coupling means, and means operable for disengaging said coupling at the end of the throwing stroke.

11. A bale throwing apparatus comprising a frame, a bale thrower mounted on said frame and movable from a bale pick-up position through a throwing stroke and then through a return stroke back to such bale pick-up position, such bale thrower having bale holding means operable for taking hold of a bale at the pick-up position and holding the bale during the throwing stroke whereby the bale can be forcibly propelled by the thrower through its throwing stroke away from the pick-up position and released at the end of the throwing stroke, a power driven reciprocable power transmitting member, normally disengaged coupling means associated with the bale thrower and operable for connecting the bale thrower to the power transmitting member for driving the bale thrower through the throwing stroke, means actuated by a bale at the pick-up position for shifting said bale thrower so as to effect the engagement of said coupling means, and means operable for disengaging said coupling at the end of the throwing stroke so as to permit the gravity return of said thrower to its pick-up position.

12. Apparatus according to claim 11 wherein said coupling means comprises a reciprocating bolt, and a keeper for receiving the bolt, said keeper being positioned by said bale thrower when in its pick-up position outside the range of reciprocating of said bolt.

13. A bale throwing apparatus comprising an upright frame including a tubular horizontal frame member, a shaft supported by said frame member, a bale thrower carried by said shaft and having bale holding means below said shaft operable for taking hold of a bale, said bale thrower being movable from a pick-up position in one direction through a throwing stroke and then in the opposite direction through a return stroke to such pick-up position, a power driven reciprocable power transmitting member, normally disengaged coupling means carried by a part of said bale thrower projecting above said shaft and operable for connecting the bale thrower to the power transmitting member for driving the bale thrower through the accelerative portion of its throwing stroke, means operable so as to effect the engagement of said coupling means when said bale thrower is in its pick-up position, and means operable for disengaging said coupling at the end of its throwing stroke so as to permit the gravity return of said thrower to its pick-up position.

No references cited.